(12) United States Patent
Liu

(10) Patent No.: US 7,896,963 B2
(45) Date of Patent: Mar. 1, 2011

(54) SELF-REDUCING, COLD-BONDED PELLETS

(75) Inventor: Hanqing Liu, Beijing (CN)

(73) Assignee: Liu Hanqing, Beijing (CN)

( * ) Notice: Subject to any disclaimer, the term of this patent is extended or adjusted under 35 U.S.C. 154(b) by 1608 days.

(21) Appl. No.: 10/667,883

(22) Filed: Sep. 23, 2003

(65) Prior Publication Data
US 2005/0061207 A1   Mar. 24, 2005

(51) Int. Cl.
    *C04B 7/36* (2006.01)
(52) U.S. Cl. ............................ 106/713; 106/739; 264/333
(58) Field of Classification Search ............... 264/333, 264/29.1, 5; 106/713, 739
    See application file for complete search history.

(56) References Cited

U.S. PATENT DOCUMENTS

| | | | |
|---|---|---|---|
| 3,150,958 A | 9/1964 | Collin et al. ................. | 75/4 |
| 3,174,846 A | 3/1965 | Brisse et al. ................. | 75/3 |
| 3,264,092 A | 8/1966 | Ban ............................. | 75/5 |
| 3,323,901 A | 6/1967 | Dahl ............................. | 75/3 |
| 3,437,474 A | 4/1969 | Imperato ..................... | 75/3 |
| 3,490,895 A | 1/1970 | Svensson ..................... | 75/3 |
| 3,617,254 A | 11/1971 | Imperato ..................... | 75/3 |
| 3,938,987 A | 2/1976 | Ban ............................. | 75/3 |
| 4,049,435 A | 9/1977 | Lotosh et al. ................ | 75/3 |
| 4,093,448 A | 6/1978 | Eliseev et al. ............... | 75/768 |
| 4,168,966 A | 9/1979 | Furui et al. .................. | 75/322 |
| 4,528,029 A | 7/1985 | Goksel ......................... | 75/3 |
| 4,636,342 A | 1/1987 | Miyashita et al. ........... | 264/82 |
| 4,846,884 A | 7/1989 | Shigematsu et al. ......... | 75/3 |
| 5,066,327 A | 11/1991 | Yanaka et al. ............... | 75/770 |
| 6,334,883 B1 | 1/2002 | Tanenaka et al. ............ | 75/319 |
| 6,409,964 B1 | 6/2002 | Aota et al. ................... | 419/19 |
| 6,565,623 B2 | 5/2003 | Contrucci et al. ........... | 75/760 |
| 6,752,865 B2 * | 6/2004 | Nayak et al. ................ | 106/693 |

FOREIGN PATENT DOCUMENTS

| | | | |
|---|---|---|---|
| CN | 106022 A | | 3/1988 |
| CN | 1158903 A | | 9/1997 |
| DE | 3139375 | | 4/1983 |
| IN | 171194 | * | 8/1992 |
| JP | 61207526 | | 9/1986 |
| JP | 61253330 | | 11/1986 |
| WO | WO02/075009 | | 9/2002 |

* cited by examiner

*Primary Examiner* — Paul Marcantoni
(74) *Attorney, Agent, or Firm* — Steptoe & Johnson LLP

(57) ABSTRACT

Self-reducing, cold-bonded pellets and a method for their production for smelting a great variety of steels, including blast furnace iron-making, non-blast furnace iron-making, and all sorts of steelmaking in steel smelting furnaces, etc. The self-reducing, cold-bonded pellets comprise iron ore concentrate, carbonaceous reducing agent, and finely divided Portland cement clinker with special requirements as binder. The components are combined together to form a mixture. Pellets are produced when the mixture is placed into a balling disc or rotating drum and water is added. Pellets with predetermined size normally ranging from about 8-16 mm are obtained by using roller screens. The pellets are then continuously placed into a curing device. Inside the curing device, the pellets will then be hydrated and carbonated by using hot gases containing carbon dioxide with a temperature range of about 100-300° C. Thereafter, after drying, the dried pellets are discharged from the curing device and will be ready for use.

30 Claims, 1 Drawing Sheet

SELF-REDUCING, COLD-BONDED PELLETS

BACKGROUND OF THE INVENTION

1. Field of the Invention

The present invention relates to self-reducing, cold-bonded pellets used in the ferrous industry and their process of production. Because of the self-reducing properties of the pellets when the cold-bonded pellets are heated to high temperatures, iron and steel can be more efficiently produced using the pellets and the pellets can be used in most smelting furnaces such as electric arc furnaces ("EAFs"), converting furnaces, open-hearth furnaces for steelmaking, blast furnaces, non-blast furnaces for iron-making, and direct reduction iron ("DRI") furnaces for producing DRI products.

2. Description of the Related Art

U.S. Pat. No. 3,150,958 to Collin et al discloses a process for the reduction of iron oxide and powdered carbonaceous material and the general principles for use of self-reducing pellets in steelmaking.

U.S. Pat. No. 3,174,846 to Brisse et al discloses a method of briquetting iron oxide fines with bituminous coal and discloses their use as blast furnace charge material.

U.S. Pat. No. 3,264,092 to Ban discloses a system for producing carbonized and metallized iron ore pellets suitable for use in a smelting operation such as a cupola type furnace or a blast furnace.

U.S. Pat. No. 3,323,901 to Dahl et al discloses pellets made of finely divided metal oxide ore, a carbonaceous reducing agent and a sulphite lye or molasses binder.

U.S. Pat. Nos. 3,437,474 and 3,617,254 to Imperato disclose a method of making lump ore from metal ore/alkaline earth metal oxides and hydroxides/carbonaceous material (e.g., coal) lumps reacted with carbon dioxide in the presence of moisture which are suitable for use in steelmaking furnaces.

U.S. Pat. No. 3,490,895 to Svensson discloses a process for the cold-hardening of pellets containing iron ore concentrates, finely divided Portland cement clinkers and water. The green pellets are embedded in a mass of discrete finely divided iron ore particles. The embedding mass is separated from the pellets when they have achieved an acceptable strength.

U.S. Pat. No. 3,938,987 to Ban discloses pellets formed from iron oxide ore with a deficiency of non-agglomerating and wherein these pellets are sintered on a traveling grate machine in the presence of externally supplied carbonaceous material in the sinter bed sufficient to make up the deficiency within the pellets.

U.S. Pat. No. 4,049,435 to Lotosh et al discloses mixing an ore with a mineral hydraulic binder, the mixture obtained is simultaneously homogenized and activated, then the mixture is pelletized and the green lumps are subjected to a heat humidity treatment followed by a two-stage heat treatment.

U.S. Pat. No. 4,093,448 to Eliseev et al discloses preparing a mixture from ore concentrates with a moisture content of 7 to 15% and with particle size less than 0.83 mm and binding material in the form of calcium oxide and magnesium oxide. The mixture is then hydrated and introduced into ore concentrates to produce a homogeneous mixture containing 4 to 15 weight percent of binding material. The homogeneous mixture is then pelletized to produce pellets by curing them in saturated steam.

U.S. Pat. No. 4,168,966 to Furui et al discloses agglomerates for use in a blast furnace containing a cementitious material and formulated to maintain a CaO to $SiO_2$ ratio in a range of from 1.2 to 1.9 and a slag forming ratio in a range from 13 to 19%. The as formed discrete moist agglomerates are cured without the necessity of a powder matrix prior to introduction to the furnace.

U.S. Pat. No. 4,528,029 to Goksel discloses self-reducing agglomerates of an iron oxide-containing material produced by preparing a moistened mixture of the ore concentrate, a finely-divided natural pyrolyzed carbonaceous material, about 1 to about 30 weight % of a bonding agent, such as burned or hydrated lime, and 0 up to about 3 weight % of a siliceous material, forming green agglomerates from this mixture; and hydrothermally hardening the green agglomerates by contacting them with steam under pressure.

U.S. Pat. No. 4,636,342 to Miyashita et al discloses continuously supplying green pellets containing a carbonating binder into a vertical type reactor to continuously pass the green pellets sequentially through a pre-drying zone, a carbonating zone and a drying zone in the vertical type reactor; blowing a pre-drying gas into the pre-drying zone to pre-dry the green pellets therein; blowing a carbonating gas comprising carbon dioxide gas of from 5 to 95 vol. % and saturated steam of from 5 to 95 vol. % into the carbonating zone to carbonate the carbonating binder contained in the green pellets therein; and blowing a drying gas into the drying zone to harden the green pellets therein.

U.S. Pat. No. 4,846,884 to Shigematsu et al mixes Portland cement, blast furnace cement or blast furnace slag by mixing the binder with iron ore fines to form large blocks. The blocks are then cured or hardened, and crushed. The disadvantage of this process is that the high temperature compression strength will be lower than what is required, and, also, it is difficult to obtain the self-reduction qualities necessary for the pellets.

U.S. Pat. No. 5,066,327 to Yanaka et al uses cement as a binder and mixes the cement with iron ore fines and/or carbonaceous matter by adding water to form the green pellets. After placing the green pellets on a traveling grate, the pellets are then treated by a gas with a concentration of 55 vol % carbon dioxide or more. The disadvantage of this method is that the concentration of the carbon dioxide needed is too high and rather difficult to find or obtain in such large quantities in an industrial environment.

U.S. Pat. No. 6,334,883 to Takenaka et al discloses pellets containing a carbonaceous material and iron ore mainly composed of iron oxide. The maximum fluidity of the carbonaceous material in softening and melting, and the ratio of iron oxide particles of 10 mu.m or smaller in the iron ore, are within a specified range.

U.S. Pat. No. 6,409,964 to Aota et al discloses shaped bodies containing particulate iron materials, such as cast pellets, briquettes and the like, with sufficient strength to withstand temperatures of up to at least 1000° C. can be obtained by using a fully hydrated high-alumina cement as the binder. The larger-sized particles of the iron ore are used in these pellets, and, therefore, the reduction speed of the pellets is relatively slow. Because of the materials used and production methods, the pellets produced by this process have difficulty in the area of self-reduction. Also, the high alumina content of the binder is not desirable in some melting processes because it will increase the alumina content of the slag.

U.S. Pat. No. 6,565,623 to Contrucci et al discloses curing and drying self-reducing agglomerates containing cement as a binder in the presence of saturated vapor at a temperature from about 70 to about 110° C. and under atmospheric pressure. The self-reducing agglomerates are comprised of mixtures of fines of iron ore and/or industrial residue containing iron oxides and/or metallic iron, fines of carbonaceous materials such as mineral coal, charcoal, green petroleum coke and similar fines, fluxing material such as steel plant slag and blast furnace slag, limestone, lime and similar materials, cement as a binder and fluxing agent, and humidity between 7 and 12%. This process employs steam to cure the cement blocks but because the green blocks have low compression strength, the green blocks must be pre-dried to reduce the water content and thereby attempt to increase the compression strength of the green blocks. However, this method of pre-drying the green blocks will render the green blocks insufficiently hydrated and decrease the quality of compression strength of the final product. The cold compression strength is considered lower than the desired average and only ranges from about 17-50 kgf/pellet.

For the iron and steel smelting techniques being developed at present, such as the direct steel making technique, the smelt-reduction iron-making technique, the DRI technique, the technique of reducing coke-to-metal ratio in blast furnaces and the iron-making technique of using cold-bonded pellets as blast furnace charge instead of sinter, the largest problem encountered is how to produce stable, highly effective and quick reducing iron ore at relatively low cost under all sorts of smelting conditions during industrial production. For this reason, development of cold-bonded agglomerates with self-reducing capability is considered to be an important approach for solving this problem.

There is a process known as the AISI process. The AISI process includes a pre-reduction stage and a smelt reduction stage. In the AISI process, pre-heated and partially pre-reduced iron ore pellets, coal or coke breeze and fluxes are top charged into a pressurized smelt reactor which contains a molten bath of iron and slag. The coal devolatilizes in the slag layer and the iron ore pellets dissolve in the slag and then are reduced by carbon (char) in the slag. The process conditions result in slag foaming. Carbon monoxide and hydrogen generated in the process are post combusted in or just above the slag layer to provide the energy required for the endothermic reduction reactions. Oxygen is top blown through a central, water cooled lance and nitrogen is injected through tuyeres at the bottom of the reactor to ensure sufficient stirring to facilitate heat transfer of the post combustion energy to the bath. The process off gas is dedusted in a hot cyclone before being fed to a shaft type furnace for pre-heating and pre-reduction of the pellets to FeO or wustite.

There is also a process known as the COREX.R™ process (COREX.R™ is a trademark of Deutsche Voest-Alpine Industrieanlagenbau GMBH and Voest-Alpine Industrieanlagenbau). In the COREX.R™ process the metallurgical work is carried out in two process reactors: the reduction furnace and the melter gasifier. Using non-coking coals and iron bearing materials such as lump ore, pellets or sinter, hot metal is produced with blast furnace quality. Passing through a pressure lock system, coal enters the dome of the melter gasifier where destructive distillation of the coal takes place at temperatures in the range of 1,100-1,150° C. Oxygen blown into the melter gasifier produces a coke bed from the introduced coal and results in a reduction gas consisting of 95% $CO+H_2$ and approximately 2% $CO_2$. This gas exits the melter gasifier and is dedusted and cooled to the desired reduction temperature between 800° C. and 850° C. The gas is then used to reduce lump ores, pellets or sinter in the reduction furnace to sponge iron having an average degree of metallization above 90%. The sponge iron is extracted from the reduction furnace using a specially designed screw conveyor and drops into the melter gasifier where it melts to the hot metal. As in the blast furnace, limestone adjusts the basicity of the slag to ensure sulfur removal from the hot metal. Depending on the iron ores used, $SiO_2$ may also be charged into the system to adjust the chemical composition and viscosity of the slag. Tapping procedure and temperature as well as the hot metal composition are otherwise exactly the same as in a blast furnace. The top gas of the reduction furnace has a net calorific value of about 7,000 $KJ/Nm^3$ and can be used for a wide variety of purposes.

The cold bonding process is defined as both a physical and chemical process to produce agglomerates of a predetermined size and with sufficient strength and durability for use. This is accomplished by means of mixing the iron-oxide containing materials, binders, and/or additives to form green pellets by using a pelletizing machine. After the pellets have been pelletized, the green pellets are then usually cured.

The cold bonding process is usually classified by the types of binders used in the pellets or the methods of curing the pellets. For example, the hydraulic bond, the carbonate bond, the thermo-hydraulic bond, the Sorel cement bond, the liquid glass bond and other organic binder bonds are processes that have all been analyzed and utilized in the past, but with less than satisfactory results. Below are two examples of the hydraulic and carbonate cold bonding methods.

The hydraulic bond process uses hydraulic substances as binders. For example, the cement used in this process is comprised of Portland cement, high alumina cement, blast furnace cement, or blast furnace slag. Also used are lime, hydro-lime, and others. After mixing the binders and iron-oxide containing materials and adding water, the pellets are formed. Thereafter, the pellets are dried and hardened. The typical hydraulic bond process uses Portland cement as a binder.

The carbonate bond process uses lime, hydrated lime, or other lime-containing materials as a binder. After mixing the binder and the iron ore fines together to form the pellets, the pellets are then cured by hot gases containing carbon dioxide. The calcium hydroxide contained in the pellets reacts with carbon dioxide to form calcium carbonate and, after this has occurred, the pellets will then gain adequate strength and durability.

All cold bonding methods to date have proved to be ineffectual in practical application. The reason for this is that all these methods possess at least one flaw resulting in the following deficiencies: low cold compression strength, unsatisfactory reduction degradation index, low high temperature strength, inadequate reducibility, high production costs, or failure to produce continuous large quantities of iron or steel for industrial utilization.

Because other known cold-bonded agglomerates cannot meet the exacting requirements of comprehensive metallurgy performance, or realize continuous industrial production at low cost, these existing techniques still cannot be widely applied to the iron and steel industries. The MTU carbonaceous pellets can be partly put into a blast furnace for iron making, and also in an electric furnace for steelmaking as well as a cupola for iron making, but the pellets cannot be put into continuous and large-scale production at low cost and therefore cannot be applied industrially.

Accordingly, it is an object of the present invention to solve the above-mentioned problems with pellets and a process for their preparation which can be put into practical operation.

SUMMARY OF THE INVENTION

The purpose of the present invention is to provide self-reducing, cold-bonded pellets and a method for their production for smelting a great variety of steels, including blast furnace iron-making, non-blast furnace iron-making, and all sorts of steelmaking in steel smelting furnaces, etc. During the production of the cold-bonded pellets, there is no water or waste gas or any other waste discharge. The raw materials in these pellets are extensive and the ferrous dust or steelmaking sludge produced from an iron and steel plant can be completely utilized. The pellets quality is highly stable. The pellets' production costs are lower than known competitive products and the investment capital is less than one-half that of sinter. Thus, the present invention can greatly reduce production costs and the inevitable pollution of an iron and steel plant.

The self-reducing, cold-bonded pellets comprise iron ore concentrate, carbonaceous reducing agent, and finely divided Portland cement clinker with special requirements as binder. The components are combined together to form a mixture. Pellets are produced when the mixture is placed into a balling disc or rotating drum and water is added. Pellets with predetermined size normally ranging from 8-16 mm are obtained by using roller screens. The pellets are then continuously placed into a curing device. Inside the curing device, the pellets will be hydrated and carbonated by using hot gases containing carbon dioxide with a temperature range of about 100-300° C. Thereafter, after drying, the dried pellets are discharged from the curing device and will be ready for use.

The present invention offers the following advantages over the prior art:

(1) all kinds of existing steelmaking furnaces and relevant technical establishments can be utilized and rebuilding with high investment costs is unnecessary;
(2) the new pellets that the present invention uses have production costs far lower than that of pre-reduced pellets and fired pellets; continuous industrial production can be attained and no pollutants will be emitted;
(3) high flexibility for different iron ores can be achieved since all kinds of concentrate fines and low cost hematite fines can be used and iron-containing dust from the steel industry such as Linz-Donawitz ("LD") steelmaking slurry can also be partly added;
(4) lower energy consumption; and
(5) the new pellets can be used for LD or EAF furnaces and this can reduce the steelmaking cost as much as 20%.

DESCRIPTION OF THE PREFERRED EMBODIMENTS

Figure 1:
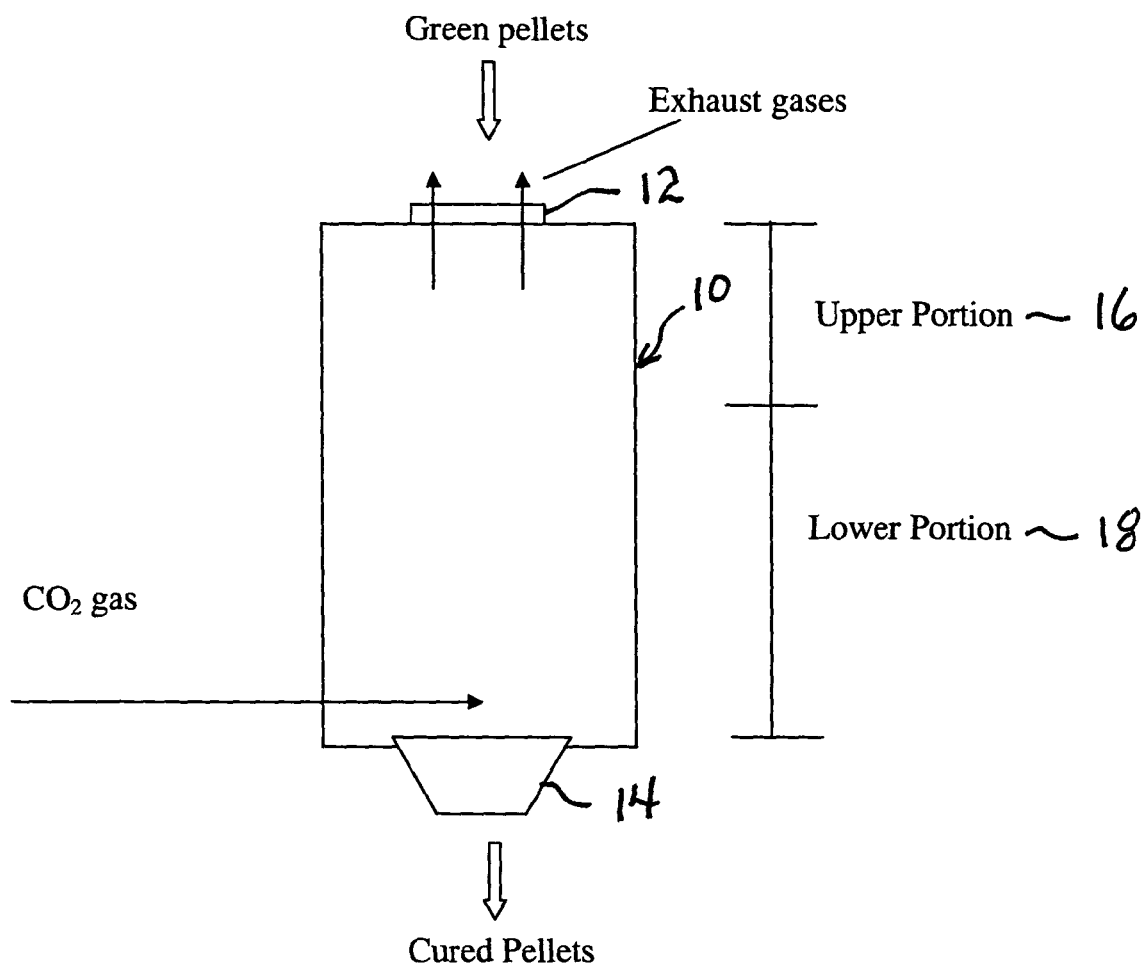
FIG. 1 is a schematic view illustrating an embodiment of the apparatus of the present invention.

The self-reducing, cold-bonded pellets comprise iron ore concentrate, carbonaceous reducing agent and finely divided Portland cement clinker with special requirements as binder. The iron ore concentrate can consist of other iron-containing materials such as steelmaking sludge, rolling scales, blast furnace dust, etc. The major portion of the iron ore concentrate should be about 200 mesh or smaller, and preferably between about 200 mesh and 325 mesh, otherwise it will decrease pellet strength. The iron content of the iron ore concentrate should normally be about 60% or more; it can also be a mixture mixed with iron ore fines. The amount of iron ore concentrate contained in the pellets is dependant on its iron content and the amount of reducing agent and binder, and is normally between about 60-79% by weight.

The carbonaceous reducing agent is typically coal powder. It can consist of coke breeze, anthracite coal, or mixtures thereof. The amount of fixed carbon contained in these carbonaceous materials is normally about 70% or more, the higher the better. The coal powder should have more than about 95% of the particles with a size smaller than about 0.3 mm, or in other words, the coal powder particles need to be about 48 mesh or smaller, normally about 60 mesh for ironmaking and about 200 mesh for steelmaking. The coal content contained in the pellets is dependent on the amount of oxidic iron contained in the pellets and the fixed carbon content of the coal, and it should be at least a value such that 90% by weight of the iron content is reduced from the total oxidic iron contained in the pellets; otherwise, it will decrease the hot strength of the pellets. The heat equilibrium also should be considered when calculating the value of coal contained in the pellets. Normally, the coal content ranges from about 10-26% by weight.

The binder is finely ground Portland cement clinker with special requirements such that it will cause the pellets to have high early strength, good quality of hydration and carbonation, such that the pellets after curing in the reacting device will possess high strength and self-reducing properties. It is known that the dicalcium silicate contained in cement clinkers has the lowest hydration speed compared with tricalcium silicate, tricalcium aluminate and brown millerite contained in the Portland cement clinker. The dicalcium silicate will greatly affect the pellets strength, so its content must be reduced to such an extent that it is less than about 20% by weight, or even better less than about 8% by weight. Other requirements of the cement clinker are as follows:

(1) the tricalcium silicate contained in the cement clinker should have a content of more than about 50% by weight, with the optimal content being about 56% by weight, the higher the better;
(2) the volume of tricalcium silicate and tricalcium aluminate should have a ratio ranging from about 5:1 to 10:1;
(3) the cement clinker should be finely divided so that the portion of the particle size measuring less than about 0.08 mm should have a volume of about 90% or more; and
(4) the free-calcium oxide (f-CaO) content should be less than about 3% by weight.

The pellets will have low compression strength if the binder is less than about 10%, but it will make the pellets comparatively more expensive to utilize if the binder is more than about 20%. Normally, the binder content of the pellets ranges from about 10-20% by weight.

In some cases, additives ranging from about 0-3% by weight may be added in the pellets. The additives can consist of dolomite, limestone, lime, hydrated lime, bentonite, calcium chloride, and any other material that can adjust the basicity, the characteristics of the slag, and the strength of the pellets. The particle size should be about 48 mesh or smaller.

The pellets' components are about 60-79% by weight of iron ore concentrate, about 10-26% by weight of carbonaceous reducing agent, and about 10-20% by weight of finely divided Portland cement clinker with a special requirement as a binder, with the total weight being 100%.

An isotropic mixture, mixed according to the predetermined proportion by weight of the materials mentioned above, is created for producing the pellets. The mixture is placed into a pelletizing device such as a balling disc or rotating drum to form pellets by adding sufficient water. Thereafter, the pellets can be cured naturally in the air, or cured by an industrial curing process that is described below.

After the pelletizing, the pellets will be graded such as being filtered by roller screens, and the reasons for this is to separate the unwanted smaller or larger pellets and to either eliminate the loose powder from adhering to the pellets or cement it firmer to the pellets. The purpose of eliminating or fusing the loose powder onto the pellets is to prevent the pellets from adhering together due to the loose powder when passing through the reacting device. The extra loose powder and the smaller or larger pellets can then be recycled to be pelletized again. The water contained in the green pellets will normally range from about 8-12% by weight.

Referring to FIG. 1, the pellets then will be placed continuously into the reacting device 10 from the top inlet 12 of the reacting device for the hydration, carbonation and drying of the pellets. The reacting device 10 is a single vertical tank having an inlet 12 at its top and an outlet 14 at its bottom, and inside the tank is systemically divided into upper and lower portions 16 and 18, respectively, with the curing gas introduced into the lower portion 18 of the reacting device 10 and discharged from the inlet 12 of the tank after contacting the pellets inside the lower and upper portions 18 and 16, respectively, of the tank. The reacting device 10 may, of course, have multiple inlets and outlets if desired. The curing gas is mostly a waste gas containing about 10% by volume or more carbon dioxide at a temperature ranging from about 100-300° C., and coming from industrial stoves such as hot-blast furnace stoves.

The pellets will sequentially and continuously pass through the upper and lower portions, 16 and 18, respectively, of the reacting device 10. While proceeding down inside the upper portion 16, the pellets are heated slowly and cured by the curing gas containing carbon dioxide coming from the lower portion 18 and by the vapor vaporized from the pellets below. While the pellets proceed down inside the lower portion 18 of the reacting device 10, the pellets will be heated and cured by curing gas containing carbon dioxide with temperatures ranging from about 100-300° C. and also by the vapor vaporized from the pellets bellow. In the course of proceeding from the inlet 12 to the outlet 14 of the reacting device 10, the pellets will sequentially and continuously be cured by mainly hydration, hydration and carbonation, mainly carbonation, and desiccation. And, the pellets will be sufficiently hydrated, carbonated and dried.

The pellets will be ready for utilization once discharged from the reacting device 10. The time from the pellets' entrance at the inlet 12 of the reacting device 10 to the conclusion and exit of the pellets from the outlet 14 of the reacting device 10 is about 24-96 hours. In the present invention, and because of the binder's rapid setting property, the pre-drying sequence of the curing process used in other inventions is not needed. This will therefore decrease the pellets' water non-uniformity that occurred during the pelletizing process, and thus guarantee that the hydration and carbonation are uniform.

The pellets may also be cured naturally in the air at a temperature of more than about 20° C. and without being placed under direct sunlight for about 14-28 days. These pellets will have a cold compression strength normally ranging from about 25-50 kgf/pellet. These pellets could be used for productions with lower pellet strength requirements, such as DRI production in rotary hearth furnaces.

Compared with the existing techniques, these cold-bonded pellets and their manufacturing method have the following characteristics:
1) the pellets have sufficient cold compression strength; the pellets cured by the process with hot gas containing carbon dioxide for 96 hours will have a cold compression strength normally ranging from about 78-200 kgf/pellet which is suitable for transportation and for storage;
2) the pellets will possess higher hot strength and will not crack or pulverize during heating and reducing, keeping their solid shape until the pellets have melted; the start-of-softening temperature will be higher than 1000° C., and this can be adjusted;
3) the pellets will have a quick reduction speed as follows:
   a) at an environmental temperature of 900° C. for 3 hours, the reduction degree can reach more than 90%; and
   b) at an environmental temperature of 1200° C. for 30 minutes, nearly all the iron ore can be reduced;
4) the pellets containing coal or coke breeze can completely replace sinter as a blast furnace charge, greatly reducing the coke-to-metal ratio by up to about 280 kgf/t; the pellets can also be used as a charge for iron making in non-blast furnaces and for DRI production;
5) the pellets can be used as a charge for direct steelmaking, greatly reducing the production costs;
6) the pellets can be stored for a long time (more than 10 years), without being pulverized;
7) relatively less investment will be required with the same scale, which is only ½ of that of sinter or less;
8) all sorts of oxidic iron ore, steelmaking sludge and rolling scales containing oxidic iron materials can be utilized in the pellets, and this will reduce raw material costs; and
9) the strength and smelting characteristics of the pellets can be adjusted in accordance with different smelting requirements.

The pellets will keep their original structure which will prevent them from cracking and pulverizing at high temperature in the preheating environment and the steelmaking furnace. By using the high quality binder, the optimal design and the special creative manufacturing process, the self-reducing cold-bonded pellets can be produced with high strength both at room temperature and high temperature. Before the separation between the slag and liquid iron, the pellets will retain their original shape when the pellets are heated to a high temperature.

The specially designed pellets for steelmaking have a rational inner carbon content. All the materials (iron ore, coal powder and binder) which will participate in the reduction reaction will be ground carefully and mixed uniformly. The specific surface can reach 2500 $cm^2/g$. All these characteristics will provide very excellent dynamic reaction conditions for the reduction reaction.

When the pellets are put into molten steel, and because of the high temperature, carbon inside the pellets gasifies completely; molecule moves very actively and the reduction rate is very high. Thus, the reduction of iron ore in these kinds of pellets can be finished in no more than 3 minutes after preheating at high temperature and then the pellets will be melted.

In summary, the self-reducing, cold-bonded pellets can meet the requirements of most forms of smelting processes because of the compatible materials used and the process of producing the pellets as a whole.

The following non-limiting examples illustrates the present invention.

Example 1

After producing a mixture comprising by weight 67% iron ore concentrate, 20% anthracite coal and 13% binder, the mixture is placed into a balling disc and water added to the mixture to produce ball pellets with a moisture content of about 9 to 11%. Thereafter, the pellets are graded with roller screens to produce pellets having the size of 8-16 mm, and then the pellets are cured by the process of the present invention with hot-blast stove gas at a temperature of 150° C. and containing about 25% by volume carbon dioxide for about 96 hours. The dry pellet's main chemical composition by weight is as follows:

| TFe* | CaO | SiO$_2$ | Al$_2$O$_3$ | MgO | C** |
|------|-----|---------|-------------|-----|-----|
| 45.4 | 8.3 | 7.0 | 2.5 | 3.3 | 14.2 |

The cold compression strength is 80 kgf/pellet. The start-of-softening temperature is 970° C. The pellets can be used as a charge for iron making in smaller blast furnaces and DRI furnaces or other applications.

Example 2

Using the same process as Example 1, but changing the components of the mixture to by weight 75% iron ore concentrate, 13% coke breeze and 12% binder, the pellet's strength will be increased when compared with Example 1. The cured pellet's main chemical composition by weight is as follows:

| TFe* | CaO | SiO$_2$ | Al$_2$O$_3$ | MgO | C** |
|------|-----|---------|-------------|-----|-----|
| 50.68 | 8.37 | 6.36 | 1.87 | 1.68 | 10.66 |

The cold compression strength is about 100 kgf/pellet, and the start-of-softening temperature is more than 1000° C. The pellet can be used instead of sinter as a charge for iron making in large blast furnaces, and it will decrease the coke consumption by 238 kg per ton of pig iron.

Further examples of the main chemical compositions of the pellets by weight are:

| TFe* | CaO | SiO$_2$ | Al$_2$O$_3$ | MgO | C** |
|------|-----|---------|-------------|-----|-----|
| 49.5 | 7.6 | 6.1 | 2.0 | 0.6 | 8.6 |
| 49.1 | 8.3 | 6.8 | 2.2 | 0.9 | 10.66 |

*Total Fe
**Fixed C

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention as defined in the following claims are expressly intended to be embraced thereby.

I claim:
1. Self-reducing, cold-bonded pellets, comprising, by weight, about 60-79% iron oxide-containing material, a main portion of said material being between about 200 mesh or smaller, about 10-26% carbonaceous reducing agent with a particle size of about 48 mesh or smaller, and about 10-20% finely divided Portland cement clinker as a binder wherein about 90% or more of the total volume of the cement clinker particles measure less than 0.08 mm and the portion of dicalcium silicate contained in the cement clinker is less than about 20% by weight, the cement clinker contains about 50% by weight or more of tricalcium silicate, the cement clinker contains tricalcium silicate and tricalcium aluminate in a ratio from about 5:1 to 10:1, with the total weight of the iron oxide-containing material, carbonaceous reducing agent and cement clinker being 100%.

2. The pellets of claim 1, wherein said iron oxide-containing material is iron ore concentrate having an iron content of at least about 60% by weight.

3. The pellets of claim 2, wherein said pellets further comprise iron ore fines, steelmaking dust, blast furnace dust, rolling scales or a mixture thereof combined with said iron ore concentrate.

4. The pellets of claim 1, wherein said carbonaceous reducing agent is coke breeze, non-coking coal, wood char, graphite or a mixture thereof.

5. The pellets of claim 4, wherein said cement clinker has a free-calcium oxide content of less than about 3% by weight.

6. The pellets of claim 1, wherein said pellets are cured in air for about 14-28 days at a temperature of about 20° C. or higher without being placed in direct sunlight.

7. The pellets of claim 1, wherein said pellets have a size ranging from about 8-16 mm.

8. The pellets of claim 1, wherein said pellets are cured with a curing gas having a carbon dioxide content of about 10% by volume or more at a temperature ranging from about 100-300° C.

9. The pellets of claim 8, wherein said pellets are cured for about 24-96 hours.

10. The pellets of claim 1, wherein said pellets further comprise an additive for adjusting the basicity of said pellets.

11. A process for producing the pellets of claim 1, comprising mixing said iron oxide-containing material, said carbonaceous reducing agent, and said finely divided Portland cement clinker, placing said mixture and water into a pelletizing device, grading said pellets to produce pellets with a predetermined size ranging from about 8-16 mm and containing about 8-12% by weight water, and placing said graded pellets into a reacting device to cure said graded pellets with a curing gas containing carbon dioxide at a temperature ranging from about 100-300° C.

12. The process of claim 11, wherein said reacting device is a vertical tank having an inlet at its top and an outlet at its bottom, the inside of said tank being divided into upper and lower portions, said curing gas being introduced into said lower portion and discharged from said inlet of said tank after contacting the pellets inside said lower and upper portions, said graded pellets sequentially and continuously proceeding down through said upper and lower portions of said reacting device after entering said reacting device from said inlet, said graded pellets being cured in said reacting device by hydration, carbonation and desiccation before said pellets are discharged from said outlet of said reacting device.

13. The process of claim 12, wherein said reacting device is a single vertical tank.

14. The process of claim 12, wherein said curing time of said pellets for said hydration, carbonation and desiccation is about 24-96 hours.

15. The process of claim 11, wherein said carbon dioxide content in said curing gas is about 10 percent by volume or more.

16. The process of claim 11, wherein said curing gas is waste gas obtained from a hot blast stove, a power plant, or a heating furnace of a rolling mill or industrial stove.

17. The process of claim 13, wherein said pelletizing device is a ball disc or rotating drum and said pellets are graded by a roller screen.

18. The process of claim 11, wherein said mixture further comprises an additive for adjusting the basicity of said pellets.

19. Self-reducing, cold-bonded pellets, comprising, by weight, about 60-79% iron ore concentrate having an iron content of at least about 60% by weight, a main portion of said iron ore concentrate being between about 200 mesh and 325 mesh, about 10-26% carbonaceous reducing agent with a particle size of about 48 mesh or smaller, and about 10-20% finely divided Portland cement clinker as a binder wherein about 90% or more of the total volume of the cement clinker particles measure less than 0.08 mm, the portion of dicalcium silicate contained in the cement clinker is less than about 20% by weight, the cement clinker contains about 50% by weight or more of tricalcium silicate, the cement clinker contains tricalcium silicate and tricalcium aluminate in a ratio from about 5:1 to 10:1 and the cement clinker has a free-calcium oxide content of less than about 3% by weight, with the total weight of the iron ore concentrate, carbonaceous reducing agent and cement clinker being 100%, the pellets having a size ranging from about 8-16 mm.

20. The pellets of claim 19, wherein said pellets further comprise iron ore fines, steelmaking dust, blast furnace dust, rolling scales or a mixture thereof combined with said iron ore concentrate.

21. The pellets of claim 19, wherein said carbonaceous reducing agent is coke breeze, non-coking coal, wood char, graphite or a mixture thereof.

22. The pellets of claim 19, wherein said pellets are cured in air for about 14-28 days at a temperature of about 20° C. or higher without being placed in direct sunlight.

23. The pellets of claim 19, wherein said pellets are cured with a curing gas having a carbon dioxide content of about 10% by volume or more at a temperature ranging from about 100-300° C.

24. The pellets of claim 23, wherein said pellets are cured for about 24-96 hours.

25. The pellets of claim 19, wherein said pellets further comprise an additive for adjusting the basicity of said pellets.

26. The pellets of claim 19, wherein said pellets are cured and have a cold compression strength of about 78-200 kgf/pellet.

27. The pellets of claim 19, wherein said pellets are cured and have a hot strength greater than about 1,000° C.

28. Self-reducing, cold-bonded pellets, comprising, by weight, about 60-79% iron ore concentrate having an iron content of at least about 60% by weight, a main portion of said iron ore concentrate being between about 200 mesh and 325 mesh, about 10-26% carbonaceous reducing agent with a particle size of about 48 mesh or smaller, and about 10-20% finely divided Portland cement clinker as a binder wherein about 90% or more of the total volume of the cement clinker particles measure less than 0.08 mm, the portion of dicalcium silicate contained in the cement clinker is less than about 20% by weight, the cement clinker contains about 50% by weight or more of tricalcium silicate, the cement clinker contains tricalcium silicate and tricalcium aluminate in a ratio from about 5:1 to 10:1 and the cement clinker has a free-calcium oxide content of less than about 3% by weight, with the total weight of the iron ore concentrate, carbonaceous reducing agent and cement clinker being 100%, the pellets having a size ranging from about 8-16 mm, said pellets being cured with a curing gas having a carbon dioxide content of about 10% by volume or more at a temperature ranging from about 100-300° C. and having a cold compression strength of about 78-200 kgf/pellet.

29. The pellets of claim 28, wherein said pellets have a hot strength greater than about 1,000° C.

30. A process for producing the pellets of claim 29, comprising mixing said iron ore concentrate, said carbonaceous reducing agent, and said finely divided Portland cement clinker, placing said mixture and water into a balling disc or rotating drum to form ball pellets, grading said ball pellets by a roller screen to produce pellets with a predetermined size ranging from about 8-16 mm and containing about 8-12% by weight water, and placing said graded pellets into a reacting device to cure said graded pellets with said curing gas containing carbon dioxide at said temperature ranging from about 100-300° C., said reacting device being a vertical tank having an inlet at its top and an outlet at its bottom, the inside of said tank being divided into upper and lower portions, said curing gas being introduced into said lower portion and discharged from said inlet of said tank after contacting the pellets inside said lower and upper portions, said graded pellets sequentially and continuously proceeding down through said upper and lower portions of said reacting device after entering said reacting device from said inlet, said graded pellets being cured in said reacting device by hydration, carbonation and desiccation before said pellets are discharged from said outlet of said reacting device.

\* \* \* \* \*